US007549108B2

(12) United States Patent
Katrak et al.

(10) Patent No.: US 7,549,108 B2
(45) Date of Patent: Jun. 16, 2009

(54) METHODS AND SYSTEMS FOR SECURE CONTROL OF SYSTEM MODES AND SUB-MODES

(75) Inventors: Kerfegar K. Katrak, Fenton, MI (US); Michael P. Turski, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 366 days.

(21) Appl. No.: 11/190,229

(22) Filed: Jul. 27, 2005

(65) Prior Publication Data

US 2006/0179366 A1 Aug. 10, 2006

Related U.S. Application Data

(60) Provisional application No. 60/649,982, filed on Feb. 4, 2005.

(51) Int. Cl.
*H03M 13/29* (2006.01)
(52) U.S. Cl. ............... 714/761; 714/700; 714/704; 714/746; 714/747; 714/753; 714/762; 341/93; 341/94; 341/97; 341/98

(58) Field of Classification Search ................ None
See application file for complete search history.

(56) References Cited

U.S. PATENT DOCUMENTS 3,648,238 A * 3/1972 Yarrington ............... 714/762
6,631,489 B2 * 10/2003 Quach et al. ............. 714/746

* cited by examiner

*Primary Examiner*—Hyung S Sough
*Assistant Examiner*—Kaushikkumar Patel

(57) ABSTRACT

Systems, methods and data structures are provided for representing robust data transmitted within a control system. The data structure includes at least two data fields identifying sub-modules and sub-modes of the control system, and optionally includes a third field for designating a primary operating mode of the control system and/or a fourth field representing a handshaking bit or value. The operating modes, sub-modes and sub-module designators are represented by values of the bits selected such that no single bit transition results in the selection of another valid operating state of the control system. As a result, single bit errors will not produce erroneous operating results. Similar concepts can be optionally applied to ensure that errors in contiguous sets of four, eight or any other number of bits do not produce valid states represented by the data structure.

19 Claims, 4 Drawing Sheets

| 502 Validity | 404 Subsystem Designators | | | | | 304 Sub Modes On/Off Control | | | | | | 204 System Modes | | | |
|---|---|---|---|---|---|---|---|---|---|---|---|---|---|---|---|
| Bit 16 | Bit 15 | Bit 14 | Bit 13 | Bit 12 | Bit 11 | Bit 10 | Bit 9 | Bit 8 | Bit 7 | Bit 6 | Bit 5 | Bit 4 | Bit 3 | Bit 2 | Bit 1 |
| 0 | 0 | 1 | 0 | 1 | 0 | 0 | 1 | 0 | 1 | 0 | 1 | 1 | 0 | 1 | 1 |
| 1 | 1 | 0 | 1 | 0 | 0 | 0 | 0 | 0 | 1 | 1 | 1 | 1 | 1 | 0 | 1 |
| | 0 | 1 | 0 | 0 | 1 | 1 | 0 | 1 | 0 | 1 | 0 | 0 | 1 | 1 | 1 |
| | 1 | 0 | 0 | 1 | 0 | 1 | 1 | 1 | 0 | 0 | 0 | 1 | 1 | 1 | 0 |
| | 0 | 0 | 1 | 0 | 1 | 0 | 1 | 1 | 0 | 1 | 0 | 0 | 0 | 0 | 1 |
| | 0 | 1 | 1 | 0 | 0 | 0 | 1 | 0 | 1 | 1 | 0 | 0 | 0 | 1 | 0 |
| | 0 | 0 | 1 | 1 | 0 | 1 | 0 | 1 | 0 | 0 | 1 | 0 | 1 | 0 | 0 |
| | 1 | 1 | 0 | 1 | 1 | 1 | 0 | 0 | 1 | 0 | 1 | 1 | 0 | 0 | 0 |
| | 1 | 0 | 0 | 0 | 1 | 0 | 0 | 1 | 1 | 0 | 1 | | | | |
| | 0 | 1 | 1 | 1 | 0 | 0 | 1 | 0 | 1 | 1 | | | | | |
| | 1 | 1 | 1 | 0 | 1 | 0 | 1 | 1 | 0 | 0 | 1 | | | | |
| | 0 | 0 | 0 | 1 | 1 | 0 | 1 | 0 | 0 | 1 | 1 | | | | |
| | 1 | 1 | 0 | 0 | 0 | 1 | 1 | 0 | 0 | 1 | 0 | | | | |
| | 0 | 1 | 1 | 1 | 1 | 1 | 1 | 0 | 1 | 0 | 0 | | | | |
| | 1 | 1 | 1 | 1 | 0 | 1 | 0 | 0 | 1 | 1 | 0 | | | | |
| | 0 | 0 | 0 | 0 | 0 | 1 | 0 | 1 | 1 | 0 | 0 | | | | |
| | | | | | | 1 | 1 | 0 | 0 | 0 | 1 | | | | |
| | | | | | | 1 | 0 | 0 | 0 | 1 | 1 | | | | |
| | | | | | | 0 | 1 | 1 | 1 | 0 | 0 | | | | |
| | | | | | | 0 | 0 | 1 | 1 | 1 | 0 | | | | |
| | | | | | | 0 | 0 | 0 | 1 | 0 | 0 | | | | |
| | | | | | | 0 | 0 | 1 | 0 | 0 | 0 | | | | |
| | | | | | | 1 | 1 | 0 | 1 | 1 | 1 | | | | |
| | | | | | | 1 | 1 | 1 | 0 | 1 | 1 | | | | |
| | | | | | | 0 | 0 | 0 | 0 | 1 | 0 | | | | |
| | | | | | | 0 | 1 | 0 | 0 | 0 | 0 | | | | |
| | | | | | | 1 | 0 | 1 | 1 | 1 | 1 | | | | |
| | | | | | | 1 | 1 | 1 | 1 | 0 | 1 | | | | |
| | | | | | | 0 | 0 | 0 | 0 | 0 | 1 | | | | |
| | | | | | | 1 | 0 | 0 | 0 | 0 | 0 | | | | |
| | | | | | | 0 | 1 | 1 | 1 | 1 | 1 | | | | |
| | | | | | | 1 | 1 | 1 | 1 | 1 | 0 | | | | |

500

| Subsystem Designators | Decimal Value | 404E Bit 15 | 404D Bit 14 | 404C Bit 13 | 404B Bit 12 | 404A Bit 11 |
|---|---|---|---|---|---|---|
| Steering | 10 | 0 | 1 | 0 | 1 | 0 |
| Brake | 20 | 1 | 0 | 1 | 0 | 0 |
| Suspension | 9 | 0 | 1 | 0 | 0 | 1 |
| Engine | 18 | 1 | 0 | 0 | 1 | 0 |
| Transmission | 5 | 0 | 0 | 1 | 0 | 1 |
| Designator 6 | 12 | 0 | 1 | 1 | 0 | 0 |
| Designator 7 | 6 | 0 | 0 | 1 | 1 | 0 |
| Designator 8 | 27 | 1 | 1 | 0 | 1 | 1 |
| Designator 9 | 17 | 1 | 0 | 0 | 0 | 1 |
| Designator 10 | 23 | 1 | 0 | 1 | 1 | 1 |
| Designator 11 | 29 | 1 | 1 | 1 | 0 | 1 |
| Designator 12 | 3 | 0 | 0 | 0 | 1 | 1 |
| Designator 13 | 24 | 1 | 1 | 0 | 0 | 0 |
| Designator 14 | 15 | 0 | 1 | 1 | 1 | 1 |
| Designator 15 | 30 | 1 | 1 | 1 | 1 | 0 |
| Designator 16 | 0 | 0 | 0 | 0 | 0 | 0 |

| 204 System Modes | | | | 304 Sub Modes On/Off Control | | | | | | 404 Subsystem Designators | | | | | 502 Validity |
|---|---|---|---|---|---|---|---|---|---|---|---|---|---|---|---|
| Bit 1 | Bit 2 | Bit 3 | Bit 4 | Bit 5 | Bit 6 | Bit 7 | Bit 8 | Bit 9 | Bit 10 | Bit 11 | Bit 12 | Bit 13 | Bit 14 | Bit 15 | Bit 16 |

METHODS AND SYSTEMS FOR SECURE CONTROL OF SYSTEM MODES AND SUB-MODES

CROSS-REFERENCES TO RELATED APPLICATIONS

This application claims the benefit of U.S. Provisional Ser. No. 60/649,982, filed Feb. 4, 2005.

TECHNICAL FIELD

The present invention generally relates to system controls, and more particularly relates to methods, systems and data structures for providing multi-state control of operating modes and sub-modes.

BACKGROUND

Vehicles such as automobiles commonly implement electronic control logic for various systems and sub-systems. Such electronic controls typically incorporate data communications between the various computing modules involved in the control system. In a vehicle stability control system, for example, electronic signals from an engine control module (ECM) or supervisory control module (SCM) can be used to place various vehicle sub-systems (e.g., braking, steering, suspension) into desired operating modes, to exchange data and instructions between the various components of the control system, and/or to carry out other tasks.

To ensure that data exchanged between control modules is reliable, typically control systems incorporate error checking techniques such as parity checks, cyclic redundancy checks (CRCs) and/or the like. Conventionally, a device preparing a data message computes a digital verification code based upon the contents of the message using a particular algorithm. The resulting verification code can then be appended to the message during transmission. The receiving module verifies the code using the same algorithm as the transmitting module to ensure that the contents of the message did not change during transmission; that is, by comparing a code computed prior to transmission with a code computed according to the same algorithm after transmission, the contents of the message can be verified to ensure that no bit errors occurred during transmission. Examples of well-known algorithms for computing reliable verification codes include the so-called CRC32 and MD4 algorithms, among others.

While error checking routines are highly reliable, they do exhibit several disadvantages in terms of bandwidth and computing resources. Particularly in the vehicle setting, where computing resources and communications bandwidth are limited, the additional space and time required to transmit the verification code are undesirable from an engineering standpoint.

It is therefore desirable to formulate a control scheme that is capable of efficiently representing the operating states of a control system without sacrificing safety or robustness. Moreover, it is desirable to create a data structure capable of efficiently and robustly representing control data, particularly within the automotive context. Furthermore, other desirable features and characteristics will become apparent from the subsequent detailed description and the appended claims, taken in conjunction with the accompanying drawings and the foregoing technical field and background.

BRIEF SUMMARY

According to various exemplary embodiments, a control system comprising a control module and a plurality of sub-modules communicates using a data structure comprising a plurality of bits. The data structure includes at least two data fields corresponding to operating modes and sub-modes of the control system, and may also include a third field for designating one of the sub-modules and/or a fourth field representing a handshaking bit or value. The various operating modes, sub-modes and sub-module designators are represented by values of the bits selected such that no single bit transition results in the selection of another valid operating state of the control system. As a result, single bit errors will not produce erroneous operating results. Similar concepts can be applied to ensure that errors in contiguous sets of four, eight or any other number of bits do not produce valid states represented by the data structure.

BRIEF DESCRIPTION OF THE DRAWINGS

The present invention will hereinafter be described in conjunction with the following drawing figures, wherein like numerals denote like elements, and:

FIG. 4 is a state table for an exemplary data field capable of designating sub-modules within a control system; and FIG. 5 is a state table for an exemplary data structure capable of representing robust data in a control system.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figures 1, 2:
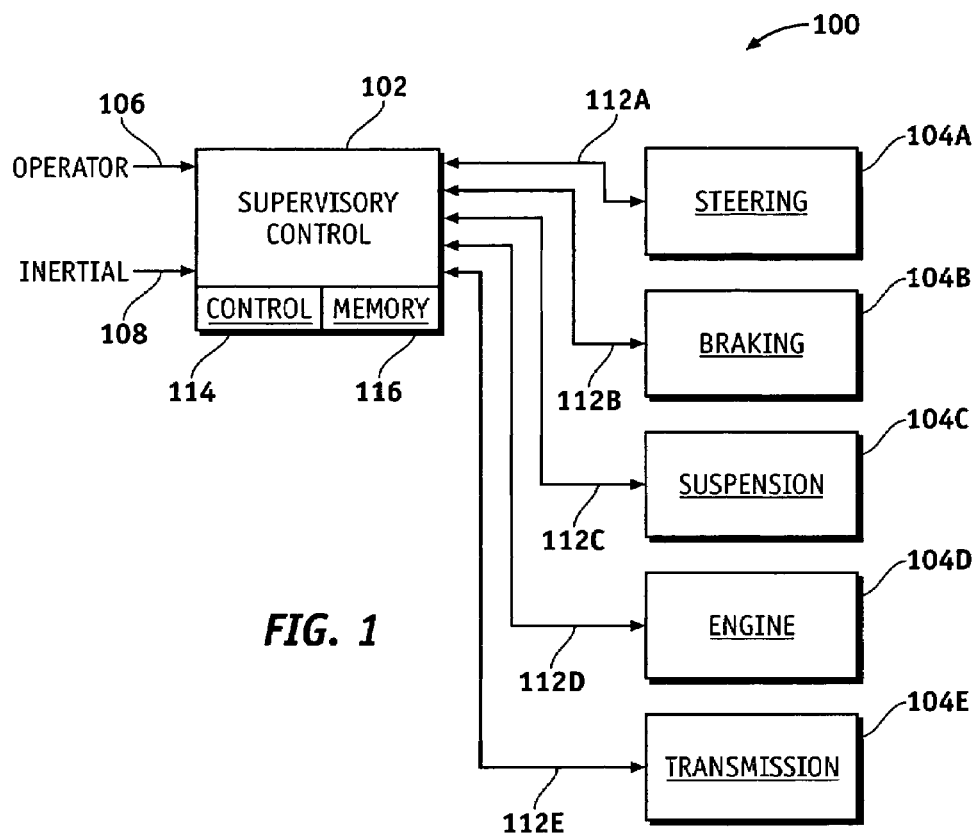
FIG. 1 is a block diagram of an exemplary stability control system.
FIG. 2 is a state table for an exemplary data field capable of representing primary control modes.

With initial reference to FIG. 1, an exemplary control system 100 suitably includes a supervisory controller 102 that communicates with any number of sub-modules 104A-E as appropriate. Control module 102 suitably provides appropriate control signals 112A-E to one or more sub-modules 104A-E based upon operator commands 106, sensor data 106, feedback received from modules 104A-E and/or any other sources. Control module 102 typically includes any type of processor or other control circuitry 114, as well as associated digital memory 116, input/output circuitry and other conventional hardware resources as appropriate. In an exemplary embodiment, control module 102 is implemented as a supervisory control module (SCM) in a conventional vehicular setting.

Sub-modules 104A-E similarly include any type of processing or control hardware, and in an exemplary embodiment each sub-module is responsible for controlling one or more sub-systems within control system 100. In a stability control system as shown in FIG. 1, for example, sub-module 104A corresponds to a steering controller, sub-module 104B corresponds to a controller for an anti-lock or other braking system, and the like. Alternate embodiments may incorporate any number of sub-modules 104, each of which may be used for any control, data gathering or other purpose. Sub-modules 104 need not be physically distinct from control module 102; to the contrary, one or more sub-modules 104A-E may be logically combined with control module 102 and/or with each other. In various stability control systems, for example, modules 104A-C for braking, steering and suspension control may physically reside within a SCM or other controller.

Data communications between control module 102 and sub-modules 104A-E take place in any appropriate manner. Data communications may take place via any serial or parallel data connection across any conventional wired or wireless data link. In an exemplary embodiment, the various signals 112A-E are transported across a vehicle data bus and/or a dedicated serial link established between control module 102 and any of sub-modules 104A-E. Alternatively, signals 112A-E may represent signals passed internally within control module 102 or another component. In embodiments wherein one or more sub-modules 104A-E reside on the same hardware as control module 102, for example, signals 112A-E may represent data structures formed in memory 116 and/or processed by controller 114. Signals 112A-E (or any subset thereof) may also be provided to or from other components (e.g., sensors, displays, other controllers, etc.) operating within the vehicle as appropriate.

Data signals 112A-E may be electrically and/or logically formatted in any appropriate manner. In an exemplary embodiment, signals 112A-E are capable of transporting a data structure that represents various operating states of system 100 and/or various sub-modules 104A-E. Through proper selection and assignment of binary digit ("bit") values used to represent the various operating modes, any errors occurring during transmission of signals 112A-E can be readily identified within the data structure, as described more fully below.

In particular, each operating mode of control system 100 may be represented by a particular combination of two or more bits. Referring now to FIG. 2, an exemplary mapping 200 of data bits 204 to various operating modes 202 of control system 100 is shown. The exemplary embodiment shown in FIG. 2 represents five active modes 202A-E and three inactive modes 202F-H using four bits 204A-D, although any number of bits 204 could be used to represent any number of operating modes 202. Further, the particular mapping shown in FIG. 2 is structured such that mode 202 is represented by a combination of bits 204A-D selected such that any change in mode 204 would require at least two bits 204 to change state. That is, each mode is selected such that at least two of bits 202A-D change value to arrive at the bit representation of any other mode 202. To transition from "off" mode 202E to "normal" mode 202A, for example, both Bit2 204B and Bit4 204D must transition from low to high. Similarly, a transition from normal mode 202A to performance mode 202B would require Bit2 202B to transition from high to low and Bit3 202C to transition from high to low. If only one of the bits 204A-D were to intentionally or otherwise change value, the resulting values would not correspond to any valid mode 202A-H in map 200, thereby indicating a fault condition or the like. As a result, bits 204A-D make up a data field 204 capable of robustly indicating a present or desired operating mode 202 for control system 100.

Although other embodiments may use any values of bits 204A-D arranged in any manner, the mapping 200 shown in FIG. 2 provides robust representation of up to eight states 202A-H using four bits 204A-D. Each of these valid states may be conceptually represented by the binary equivalent values shown in FIG. 2, column 205 (e.g., decimal states 11, 13, 7, 14, 1, 2, 4 and 8 in FIG. 2). Although FIG. 2 shows states 202A-E assigned to the "Normal", "Performance", "Comfort", "Secure" and "Off" modes of a stability control system, alternate embodiments may assign states 202 to represent any number of operating modes of any other device or system as appropriate. The exemplary mapping shown in FIG. 2, however, assigns the most robust bit mappings to "normal" mode 202A and "performance" mode 202B since these modes frequently have the most stringent safety requirements. Comfort mode 202C and Secure mode 202D are shown assigned to decimal states 7 and 14 because the three consecutive bits with "high" values present in these states could be considered less robust in certain environments, therefore making these states more appropriate for representing states with more relaxed requirements. Additionally, the "off" mode 202E is shown mapped to decimal state 1, which may be advantageous in environments wherein an accidental arithmetic shift left (ASL) operation may occur. If data field 204 were initialized to an "all-zero" state, for example, and an accidental ASL were to occur, even if a "1" were to appear in the rightmost bit of structure 204, the result would be to place the system into a non-disruptive "off" mode. Again, other systems will map the various bit states to suitable operating modes in any manner, and according to the particular needs of the implementation desired.

Any invalid states of data field 200 can be represented by the one's or two's complement of the valid states. Column 206, for example, shows the decimal equivalents of the one's complement values for each valid mode 202A-H, and any occurrences of these values within data field 204 can be readily identified as being incompatible or invalid for mapping scheme 200. Any single bit error occurring during transmission or processing of data field 204, then, would produce a state of bits 204A-D that could be readily identified as invalid. As a result, the bit error could be quickly and easily detected even in the absence of extraneous error checking routines.

Figure 3:
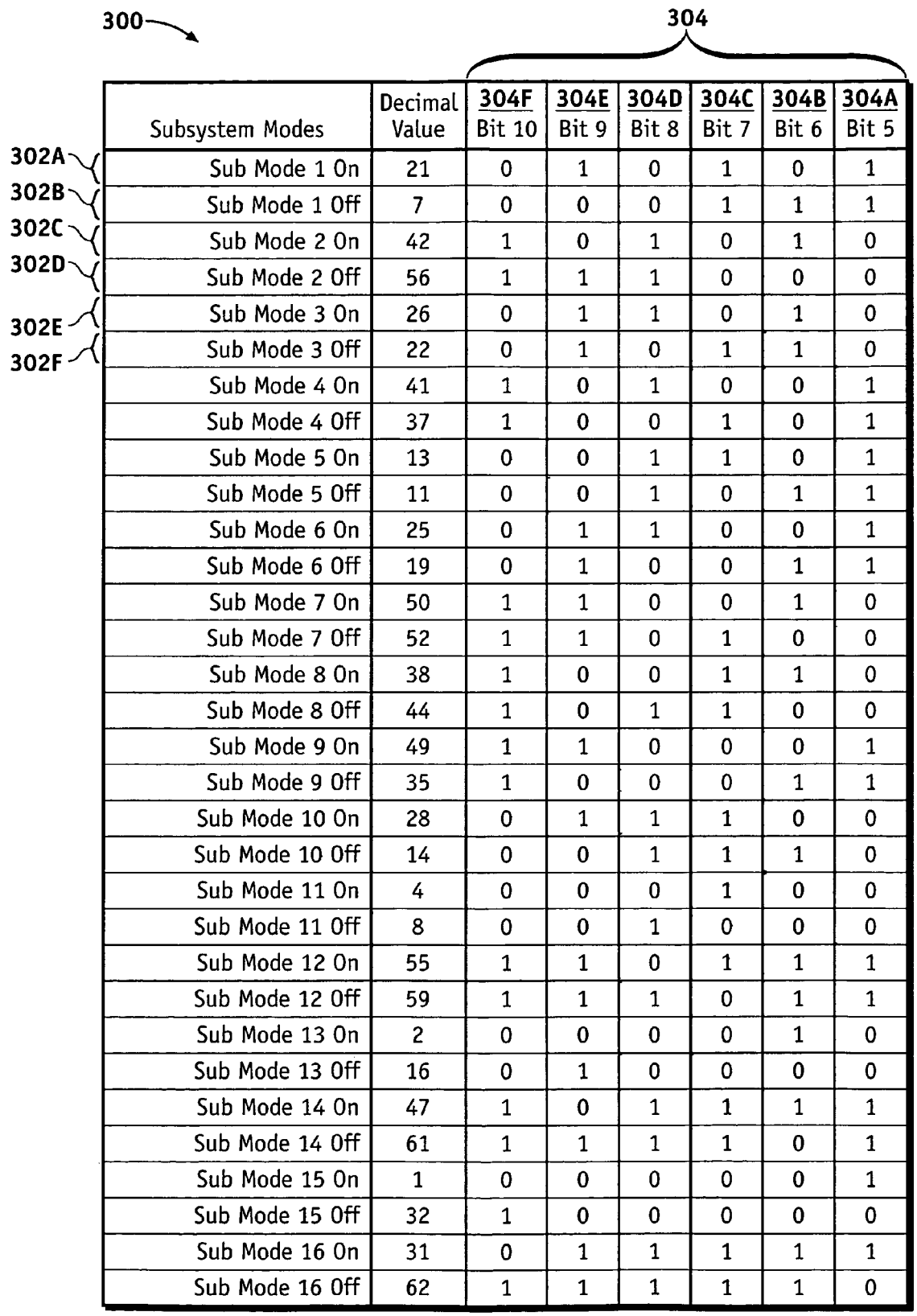
FIG. 3 is a state table for an exemplary data field capable of representing ON/OFF controls for various sub-modes of a control system.

Similar concepts may be applied to any number of additional data fields. With reference now to FIG. 3, for example, an exemplary mapping 300 suitable for creating a data field 304 for representing operating modes 302 of one or more sub-modules 104 (FIG. 1) suitably includes any number of bits 304A-F arranged as appropriate. The values stored within data field 304 can be used to indicate, activate or otherwise provide data to one or more sub-modules 104 regarding the operating modes 302 of those modules. The operating modes 302 of the various sub-modules 104 are referenced herein as "sub-system modes" or "sub-modes" for convenience.

In an exemplary stability control system, modes 302 could represent on/off states of various sub-module operating modes. The exemplary modes 302 shown in FIG. 3 correspond to "on" or "off" states of various modes of a braking system 104B; similar concepts, however, could be applied to represent any number of operating modes in any number of other systems 104. Similarly, a single map 300 may be used to represent operating modes of multiple sub-systems 104, and/or various mappings 300 could be used within an overall data structure (as described below) to allow sub-mode indication for various modules 104.

Mapping 300 suitably assigns values of bits 304A-F to modes 302 in a robust manner that allows for ready detection of bit errors, as described above. Such robustness may be provided, for example, by ensuring that each valid mode 302 differs from every other valid mode by at least two values of bits 304A-F. Moreover, the various bit mappings for each mode 304 may be further selected such that the two bit transitions required for any state transition are in opposing directions (e.g., a low-to-high transition and a high-to-low). Requiring bit transitions in opposing directions to produce a change in operating mode/sub-mode further improves the robustness of system 100 without requiring significant additional resources. In the six-bit implementation shown in FIG. 3, for example, sixteen sub-modes spanning any number of modules can be robustly represented using the techniques described herein. Additional robust modes may be provided in any of the data fields described herein by increasing the number of bits in data field 304 and/or by relaxing the robustness parameters on some or all modes.

FIG. 4 shows an exemplary mapping 400 for identifying or designating one or more sub-modules 104. This designation may be used, for example, to indicate which module 104 is intended to process sub-mode information contained within data field 304, or for any other purpose. As described above, the various values of bits 404A-E can be selected to allow easy detection of bit errors and to improve system robustness. Techniques used to improve robustness include assigning values of bits 404A-E to each mode 402A-E such that any mode transition requires at least two bit transitions. Although FIG. 4 shows five designators 402A-E corresponding to subsystems 104A-E, other embodiments may use any number of bits 404 or modes 402 to designate any type or number of modules or components as appropriate.

The one's or two's complements of the valid states used within data mapping 400 may be used to readily identify fault modes, as described above. Further, the one's or two's complement values of mapping 400 could be used to implement a program flow control mechanism for programs executing within control system 400. The one's or two's complement of the subsystem actuator value can be stored in one or more sub-modules 104, for example, and compared against a subsequently-computed complement to verify that that no program flow faults have occurred. That is, by computing a one's or two's complement of a received or processed actuator value and comparing the computed value to a stored value, the validity of the processing sequence can be verified. Similar concepts could be applied to data mappings 200 and 300 described above as well.

Turning now to FIG. 5, an exemplary data structure 500 suitable for data 112 passed between modules 102, 104 in a control system 100 suitably includes various data fields 204, 304, 404 for designating primary system modes, sub-modes and sub-systems or other information. The data structure 500 may also include an additional field 502 that provides validity, handshaking or other information as appropriate. In various embodiments, each of the bit mappings used to represent the various operating modes, sub-modes, designators and other information are selected such that no error produced by any single bit and/or any contiguous sequence of four or eight bits results in an erroneous system mode, subsystem designation and/or sub-mode transition.

The exemplary data structure 500 shown in FIG. 5 is implemented with one data word, which conventionally corresponds to two contiguous eight-bit bytes for a total of sixteen bits, although other computing systems using different memory addressing schemes, bus sizes and other parameters may implement data structure 500 with any number of contiguous or non-contiguous bits. The exemplary sixteen bit structure shown in FIG. 5 represents a primary operating mode 204 for control system 100 with four bits, a sub-mode 304 for one or more sub-modules 104 with six bits, and a designator 404 for one or more sub-modules 104 with five bits. Field 502 in FIG. 5 is reserved for handshaking and validity purposes as appropriate. Such an arrangement may be particularly well-suited for a stability control system 100 or the like, although similar concepts could be applied in a wide array of equivalent settings. Again, alternate embodiments may use any arrangement or mappings of data fields and bit values used to represent the various modes, sub-modes and other information.

Each of the bits within structure 500 may be set and/or reset to represent data as described above. By selecting bit values according to the various mapping schemes 200, 300 and 400 described above, structure 500 can represent state data in an efficient yet robust manner. The exemplary data values presented for fields 204, 304 and 404 show one mapping for producing robust behavior for a sixteen bit data structure 500. While the more robust bit mappings are generally shown closer to the top of FIG. 4, although other mappings or arrangements of bits could be used in alternate embodiments. Using the robustness techniques described above, data field 204 can represent up to eight robust system modes using four Bits1-4. The robust states shown in FIG. 5 could be used in a stability control system 100, for example, to represent Normal, Performance, Secure, Comfort, Off and/or any other system operating modes as appropriate. Data field 304 could similarly be used to represent up to thirty-two robust sub-mode on/off controls using six data bits (Bits5-10). In the exemplary embodiment shown in FIG. 5, however, data field 304 is further constrained in by defining each mode transition to require at least two independent bit transitions in opposite directions (e.g., "low" to "high" and "high" to "low"), thereby reducing the number of available modes to sixteen. For a braking subsystem 104B, for example, the various sub-modes may include activating or deactivating heavy braking, three wheel speed, drag control, and/or any other features. Data field 404 shown in FIG. 5 similarly represents up to sixteen subsystem designators with five bits (Bits11-15). Such mode designators in an exemplary stability control system could include designators for steering, braking, suspension, engine, transmission or the subsystems as appropriate. Field 502 may be used, for example, to provide handshaking between a master controller 102 and one or more sub-modules 104 in the event that a data communications fault should occur. Alternatively, field 502 may be used as a conventional parity bit for additional bit error checking, or for any other purpose.

In operation, then, data structure 500 can be used to transmit state information between the various components within control system 100 (FIG. 1). In an exemplary scenario, the various bits making up data structure 500 are initialized to a common value (e.g., "0" or "low"), and then a module 102, 104 sets the various bits to designate operating mode, sub-mode, submodule designator and/or other information as appropriate. This information is transmitted to another module 102, 104 as signal 112. The receiving module then verifies the contents of data structure 500 to ensure that the relevant data contained within structure 500 has not changed during transport. Validation may take place in any appropriate manner, such as by comparing the received value to a lookup table or other memory structure capable of storing fault modes for structure 500 as appropriate. Alternatively, the one's or two's complement values of various data fields (e.g., field 404) can be used to verify that the received data is valid according to the particular mapping scheme used by data structure 500. If one or more bit errors are found within data structure 500, then the receiving module 102, 104 may appropriately notify the transmitting module of the fault by, for example, setting the bit flag in field 502, or through any other appropriate manner.

Using the concepts, systems, structures and techniques set forth herein, many different types of electronic controls could be formulated for placing a control system into any number of desired states or sub-states. The general concepts described herein could be modified in many different ways to implement a diverse array of equivalent multi-state controls for vehicles and other settings. Moreover, the various data structures shown in the figures and tables may be reduced, modified and/or supplemented in any manner. That is, the various signal bits could be arranged in any order and in any combination to create any number of states representing any number of operating modes, sub-modes or other parameters in a wide array of alternate embodiments.

Although the various embodiments are most frequently described with respect to automotive applications, and electronically-controlled vehicle stability systems in particular, the invention is not so limited. Indeed, the concepts, systems and structures described herein could be readily applied in any aeronautical, aerospace, defense, marine or other vehicular context, for example. The concepts and structures described herein could similarly be readily applied in commercial, home, industrial, consumer electronics or other settings.

While at least one exemplary embodiment has been presented in the foregoing detailed description, a vast number of variations exist. The exemplary embodiments described herein are intended only as examples, and are not intended to limit the scope, applicability, or configuration of the invention in any way. Rather, the foregoing detailed description will provide those skilled in the art with a convenient road map for implementing one or more exemplary embodiments. Various changes can therefore be made in the functions and arrangements of elements set forth herein without departing from the scope of the invention as set forth in the appended claims and the legal equivalents thereof.

What is claimed is:

1. A computer-readable medium having computer-executable information stored thereon, wherein the computer executable information comprises a data structure for a control system having a control module and a plurality of sub-modules, the data structure comprising a plurality of bits, wherein each of the bits is capable of representing a first value and a second value, the data structure comprising:
   a first data field configured to identify one of the plurality of sub-modules of the control system with a first portion of said bits, wherein each of the plurality of sub-modules has a corresponding value for each of said first portion of bits selected such that no single bit transition of any of said first portion of bits between said first value and said second value results in a state corresponding to another of said plurality of sub-modules; and
   a second data field adjacent to the first data field configured to represent a plurality of sub-modes of the control system with a second portion of said bits, wherein each of the sub-modes has a corresponding value for each of said second portion of bits selected such that no single bit transition of any of said second portion of bits between said first value and said second value results in a state corresponding to another of said sub-modes, and wherein the data structure is further arranged such that each of the states corresponding to said sub-modules and to said sub-modes are further selected such that no error produced by any contiguous sequence of four bits results in an erroneous identified sub-module or said sub-mode transition.

2. The computer-readable medium claim 1 wherein each of the states corresponding to said sub-modes are further selected such that any transition between sub-modes results from a transition of one of said second portion of bits from said first state to said second state and a transition of another of said second portion of bits from said second state to said first state.

3. The computer-readable medium of claim 1 wherein each of the states corresponding to said sub-modules and said sub-modes are further selected such that no transition of any contiguous eight bits produces a change in said identified sub-module or said sub-mode.

4. The computer-readable medium of claim 1 further comprising a fourth data field configured to represent handshaking value with one of said bits.

5. The computer-readable medium of claim 1 further comprising a third data field configured to represent a plurality of primary operating modes for said control system with a third portion of said bits, wherein each of the primary operating modes has a corresponding state of said third portion of bits selected such that no transition of any of said third portion of bits between said first value and said second value results in a state corresponding to another of said primary operating modes.

6. The computer-readable medium of claim 5 wherein the states corresponding to said primary operating modes are selected from the following table:

| State | Bit4 | Bit3 | Bit2 | Bit1 |
|---|---|---|---|---|
| 1 | 1 | 0 | 1 | 1 |
| 2 | 1 | 1 | 0 | 1 |
| 3 | 0 | 1 | 1 | 1 |
| 4 | 1 | 1 | 1 | 0 |
| 5 | 0 | 0 | 0 | 1 |
| 6 | 0 | 0 | 1 | 0 |
| 7 | 0 | 1 | 0 | 0 |
| 8 | 1 | 0 | 0 | 0. |

7. The computer-readable medium of claim 6 wherein the states corresponding to said sub-modes are selected from the following table:

| State | Bit10 | Bit9 | Bit8 | Bit7 | Bit6 | Bit5 |
|---|---|---|---|---|---|---|
| 1 | 0 | 1 | 0 | 1 | 0 | 1 |
| 2 | 0 | 0 | 0 | 1 | 1 | 1 |
| 3 | 1 | 0 | 1 | 0 | 1 | 0 |
| 4 | 1 | 1 | 1 | 0 | 0 | 0 |
| 5 | 0 | 1 | 1 | 0 | 1 | 0 |
| 6 | 0 | 1 | 0 | 1 | 1 | 0 |
| 7 | 1 | 0 | 1 | 0 | 0 | 1 |
| 8 | 1 | 0 | 0 | 1 | 0 | 1 |
| 9 | 0 | 0 | 1 | 1 | 0 | 1 |
| 10 | 0 | 0 | 1 | 0 | 1 | 1 |
| 11 | 0 | 1 | 1 | 0 | 0 | 1 |
| 12 | 0 | 1 | 0 | 0 | 1 | 1 |
| 13 | 1 | 1 | 0 | 0 | 1 | 0 |
| 14 | 1 | 1 | 0 | 1 | 0 | 0 |
| 15 | 1 | 0 | 0 | 1 | 1 | 0 |
| 16 | 1 | 0 | 1 | 1 | 0 | 0 |
| 17 | 1 | 1 | 0 | 0 | 0 | 1 |
| 18 | 1 | 0 | 0 | 0 | 1 | 1 |
| 19 | 0 | 1 | 1 | 1 | 0 | 0 |
| 20 | 0 | 0 | 1 | 1 | 1 | 0 |
| 21 | 0 | 0 | 0 | 1 | 0 | 0 |
| 22 | 0 | 0 | 1 | 0 | 0 | 0 |
| 23 | 1 | 1 | 0 | 1 | 1 | 1 |
| 24 | 1 | 1 | 1 | 0 | 1 | 1 |
| 25 | 0 | 0 | 0 | 0 | 1 | 0 |
| 26 | 0 | 1 | 0 | 0 | 0 | 0 |

-continued

| State | Bit10 | Bit9 | Bit8 | Bit7 | Bit6 | Bit5 |
|---|---|---|---|---|---|---|
| 27 | 1 | 0 | 1 | 1 | 1 | 1 |
| 28 | 1 | 1 | 1 | 1 | 0 | 1 |
| 29 | 0 | 0 | 0 | 0 | 0 | 1 |
| 30 | 1 | 0 | 0 | 0 | 0 | 0 |
| 31 | 0 | 1 | 1 | 1 | 1 | 1 |
| 32 | 1 | 1 | 1 | 1 | 1 | 0. |

8. The computer-readable medium of claim 1 wherein the states corresponding to said sub-modes are selected from the following table:

| State | Bit10 | Bit9 | Bit8 | Bit7 | Bit6 | Bit5 |
|---|---|---|---|---|---|---|
| 1 | 0 | 1 | 0 | 1 | 0 | 1 |
| 2 | 0 | 0 | 0 | 1 | 1 | 1 |
| 3 | 1 | 0 | 1 | 0 | 1 | 0 |
| 4 | 1 | 1 | 1 | 0 | 0 | 0 |
| 5 | 0 | 1 | 1 | 0 | 1 | 0 |
| 6 | 0 | 1 | 0 | 1 | 1 | 0 |
| 7 | 1 | 0 | 1 | 0 | 0 | 1 |
| 8 | 1 | 0 | 0 | 1 | 0 | 1 |
| 9 | 0 | 0 | 1 | 1 | 0 | 1 |
| 10 | 0 | 0 | 1 | 0 | 1 | 1 |
| 11 | 0 | 1 | 1 | 0 | 0 | 1 |
| 12 | 0 | 1 | 0 | 0 | 1 | 1 |
| 13 | 1 | 1 | 0 | 0 | 1 | 0 |
| 14 | 1 | 1 | 0 | 1 | 0 | 0 |
| 15 | 1 | 0 | 0 | 1 | 1 | 0 |
| 16 | 1 | 0 | 1 | 1 | 0 | 0 |
| 17 | 1 | 1 | 0 | 0 | 0 | 1 |
| 18 | 1 | 0 | 0 | 0 | 1 | 1 |
| 19 | 0 | 1 | 1 | 1 | 0 | 0 |
| 20 | 0 | 0 | 1 | 1 | 1 | 0 |
| 21 | 0 | 0 | 0 | 1 | 0 | 0 |
| 22 | 0 | 0 | 1 | 0 | 0 | 0 |
| 23 | 1 | 1 | 0 | 1 | 1 | 1 |
| 24 | 1 | 1 | 1 | 0 | 1 | 1 |
| 25 | 0 | 0 | 0 | 0 | 1 | 0 |
| 26 | 0 | 1 | 0 | 0 | 0 | 0 |
| 27 | 1 | 0 | 1 | 1 | 1 | 1 |
| 28 | 1 | 1 | 1 | 1 | 0 | 1 |
| 29 | 0 | 0 | 0 | 0 | 0 | 1 |
| 30 | 1 | 0 | 0 | 0 | 0 | 0 |
| 31 | 0 | 1 | 1 | 1 | 1 | 1 |
| 32 | 1 | 1 | 1 | 1 | 1 | 0. |

9. The computer-readable medium of claim 1 wherein the states corresponding to said identified sub-modules are selected from the following table:

| State | Bit15 | Bit14 | Bit13 | Bit12 | Bit11 |
|---|---|---|---|---|---|
| 1 | 0 | 1 | 0 | 1 | 0 |
| 2 | 1 | 0 | 1 | 0 | 0 |
| 3 | 0 | 1 | 0 | 0 | 1 |
| 4 | 1 | 0 | 0 | 1 | 0 |
| 5 | 0 | 0 | 1 | 0 | 1 |
| 6 | 0 | 1 | 1 | 0 | 0 |
| 7 | 0 | 0 | 1 | 1 | 0 |
| 8 | 1 | 1 | 0 | 0 | 1 |
| 9 | 1 | 0 | 0 | 0 | 1 |
| 10 | 1 | 0 | 1 | 1 | 1 |
| 11 | 1 | 1 | 1 | 0 | 1 |
| 12 | 0 | 0 | 0 | 1 | 1 |
| 13 | 1 | 1 | 1 | 0 | 0 |
| 14 | 0 | 1 | 1 | 1 | 1 |
| 15 | 1 | 1 | 1 | 1 | 0 |
| 16 | 0 | 0 | 0 | 0 | 0. |

10. The computer-readable medium of claim 1 wherein the plurality of bits consists of sixteen bits.

11. The computer-readable medium of claim 10 wherein the first portion of bits comprises five bits, the second portion of bits comprises six bits, and the third portion of bits comprises four bits.

12. A method of robustly representing data in a control system comprising a control module and a plurality of sub-modules using a data structure comprising a plurality of bits, wherein each of the bits is capable of representing at least a first value or a second value, the method comprising the steps of:
   designating one of a plurality of primary operating modes of said control system with a first portion of said bits, wherein each of the primary operating modes has a corresponding state of said first portion of bits selected such that no single bit transition of any of said first portion of bits between said first value and said second value results in a state corresponding to another of said primary operating modes;
   designating one of a plurality of module operating modes for at least one of said sub-modules with a second portion of said bits, wherein each of the module operating modes has a corresponding state of said second portion of bits selected such that no single bit transition of any of said second portion of bits between said first value and said second value results in a state corresponding to another of said module operating modes; and
   designating one of said plurality of sub-modules with a third portion of said bits, wherein each of the plurality of sub-modules has a corresponding designator of said third portion of bits selected such that no single bit transition of any of said third portion of bits between said first value and said second value results in a state designating to another of said sub-modules, wherein each of the primary operating modes, module operating modes and sub-modules are designated such that no error produced by any contiguous sequence of four bits results in an erroneous primary operating mode, module operating mode or sub-module transition.

13. The method of claim 12 further comprising the step of initially setting each of said plurality of bits to said first value.

14. The method of claim 12 further comprising the step of transmitting the data structure from the control module to one of the plurality of sub-modules.

15. The method of claim 14 further comprising the step of verifying the integrity of the data structure at the receiving one of the plurality of sub-modules.

16. The method of claim 15 further comprising the step of indicating the results of said verifying step in a fourth portion of said bits.

17. The method of claim 12 further comprising the steps of:
   storing a complement value of said corresponding state in the module;
   performing a computation upon second portion of bits;
   subsequently computing a complement of the second portion of bits; and
   comparing the subsequently-computed complement to the stored complement value to verify the computation performed.

18. The computer-readable medium of claim 7 wherein the states corresponding to said identified sub-modules are selected from the following table:

| State | Bit15 | Bit14 | Bit13 | Bit12 | Bit11 |
|---|---|---|---|---|---|
| 1 | 0 | 1 | 0 | 1 | 0 |
| 2 | 1 | 0 | 1 | 0 | 0 |
| 3 | 0 | 1 | 0 | 0 | 1 |
| 4 | 1 | 0 | 0 | 1 | 0 |
| 5 | 0 | 0 | 1 | 0 | 1 |
| 6 | 0 | 1 | 1 | 0 | 0 |
| 7 | 0 | 0 | 1 | 1 | 0 |
| 8 | 1 | 1 | 0 | 1 | 1 |
| 9 | 1 | 0 | 0 | 0 | 1 |
| 10 | 1 | 0 | 1 | 1 | 1 |
| 11 | 1 | 1 | 1 | 0 | 1 |
| 12 | 0 | 0 | 0 | 1 | 1 |
| 13 | 1 | 1 | 0 | 0 | 0 |
| 14 | 0 | 1 | 1 | 1 | 1 |
| 15 | 1 | 1 | 1 | 1 | 0 |
| 16 | 0 | 0 | 0 | 0 | 0. |

19. A control system comprising a control module and a plurality of sub-modules, wherein the control module is configured to exchange data with each of the plurality of sub-modules using a data structure comprising a plurality of bits, wherein each of the bits is capable of representing at least a first value or a second value, the data structure comprising:

a first data field configured to represent a plurality of system modes of the control system with a first portion of said bits, wherein each of the system modes has a corresponding state of said first portion of bits selected such that no single bit transition of any of said first portion of bits between said first value and said second value results in a state corresponding to another of said system modes;

a second data field adjacent to the first data field and configured to represent a plurality of sub-modes with a second portion of said bits, each sub-mode corresponding to an operating mode for at least one of said sub-modules, wherein each of the sub-modes has a corresponding state of said second portion of bits selected such that no single bit transition of any of said second portion of bits between said first value and said second value results in a state corresponding to another of said sub-modes; and a third data field adjacent to the second data field and configured to represent a designation for each of said sub-modules with a third portion of said bits, wherein each of the designations has a corresponding state of said third portion of bits selected such that no single bit transition of any of said third portion of bits between said first value and said second value results in a state corresponding to another of said designations;

wherein the data structure is further arranged such that each of the bit mappings used to represent the system modes, sub-module operating modes and sub-module designators are selected such that no error produced by any single bit nor any contiguous sequence of four or eight bits results in an erroneous system mode, subsystem designation or sub-mode transition.

* * * * *